United States Patent
Wang et al.

(10) Patent No.: US 10,777,001 B2
(45) Date of Patent: Sep. 15, 2020

(54) METHOD AND DEVICE OF LABELING LASER POINT CLOUD

(71) Applicant: TuSimple, Inc., San Diego, CA (US)

(72) Inventors: Zhimeng Wang, Beijing (CN); Jieshu Li, Beijing (CN); He Zheng, Beijing (CN)

(73) Assignee: TUSIMPLE, INC., San Diego, CA (US)

( * ) Notice: Subject to any disclaimer, the term of this patent is extended or adjusted under 35 U.S.C. 154(b) by 22 days.

(21) Appl. No.: 15/957,487

(22) Filed: Apr. 19, 2018

(65) Prior Publication Data

US 2018/0308283 A1    Oct. 25, 2018

(30) Foreign Application Priority Data

Apr. 20, 2017    (CN) .......................... 2017 1 0262366

(51) Int. Cl.
| | | |
|---|---|---|
| *G06T 17/00* | (2006.01) | |
| *G06T 17/05* | (2011.01) | |
| *G01S 17/89* | (2020.01) | |
| *G06T 19/00* | (2011.01) | |
| *G06T 19/20* | (2011.01) | |
| *G01S 7/48* | (2006.01) | |
| *G06F 3/0482* | (2013.01) | |
| *G06F 3/0481* | (2013.01) | |
| *G06F 3/0484* | (2013.01) | |
| *G01S 17/10* | (2020.01) | |

(52) U.S. Cl.
CPC ............ *G06T 17/05* (2013.01); *G01S 7/4808* (2013.01); *G01S 17/89* (2013.01); *G06T 19/003* (2013.01); *G06T 19/20* (2013.01); *G01S 17/10* (2013.01); *G06F 3/0482* (2013.01); *G06F 3/04815* (2013.01); *G06F 3/04845* (2013.01); *G06T 2200/24* (2013.01); *G06T 2219/004* (2013.01); *G06T 2219/2012* (2013.01)

(58) Field of Classification Search
CPC ...................................................... G06T 17/05
See application file for complete search history.

(56) References Cited

U.S. PATENT DOCUMENTS

| | | | | |
|---|---|---|---|---|
| 9,183,459 | B1 * | 11/2015 | Zhang | ............... G06K 9/52 |
| 9,245,170 | B1 * | 1/2016 | Nikic | ............... G01S 17/89 |
| 9,836,885 | B1 * | 12/2017 | Eraker | ........... G06Q 30/0623 |
| 2008/0103996 | A1 * | 5/2008 | Forman | ............. G06N 20/00 |
| | | | | 706/12 |

(Continued)

OTHER PUBLICATIONS

Huang et al., "Point Cloud Labeling using 3D Convolutional Neural Network", 2016, 23rd International Conference on Pattern Recognition (ICPR), pp. 2670-2675 (Year: 2016).*

*Primary Examiner* — Phong X Nguyen
(74) *Attorney, Agent, or Firm* — Paul Liu; Perkins Coie LLP (57) ABSTRACT

The present application discloses a method and device of labeling laser point cloud. The method comprises: receiving data of a laser point cloud; constructing a 3D scene and establishing a 3D coordinate system corresponding to the 3D scene; converting a coordinate of each laser point in the laser point cloud into a 3D coordinate in the 3D coordinate system; mapping laser points included in the laser point cloud into the 3D scene respectively according to the 3D coordinate of the laser points; labeling the laser points in the 3D scene.

21 Claims, 5 Drawing Sheets

(56) References Cited

U.S. PATENT DOCUMENTS

| | | | | |
|---|---|---|---|---|
| 2010/0034426 | A1* | 2/2010 | Takiguchi | G01C 21/3602 |
| | | | | 382/106 |
| 2012/0281907 | A1* | 11/2012 | Samples | G06K 9/00201 |
| | | | | 382/159 |
| 2013/0051658 | A1* | 2/2013 | Hwang | G06K 9/00201 |
| | | | | 382/154 |
| 2017/0094262 | A1* | 3/2017 | Peterson | H04N 21/854 |
| 2017/0109611 | A1* | 4/2017 | Luo | G06K 9/6262 |
| 2017/0116781 | A1* | 4/2017 | Babahajiani | G06T 17/20 |
| 2017/0206440 | A1* | 7/2017 | Schrier | G05D 1/021 |
| 2018/0075648 | A1* | 3/2018 | Moghadam | G01S 17/89 |
| 2018/0075666 | A1* | 3/2018 | Feng | G06K 9/00671 |
| 2018/0136332 | A1* | 5/2018 | Barfield, Jr. | G01S 17/89 |
| 2018/0157920 | A1* | 6/2018 | Hu | B60R 1/00 |
| 2018/0158206 | A1* | 6/2018 | Han | G01C 21/32 |
| 2018/0165816 | A1* | 6/2018 | Bellis | G06T 7/20 |
| 2018/0225515 | A1* | 8/2018 | Jiang | G06K 9/00 |
| 2018/0275277 | A1* | 9/2018 | Li | G01S 7/4808 |

* cited by examiner

METHOD AND DEVICE OF LABELING LASER POINT CLOUD

CROSS-REFERENCES TO RELATED APPLICATIONS

The present application claims the priority from Chinese Patent Application No. 201710262366.X, filed with the Chinese Patent Office on Apr. 20, 2017 and entitled "METHOD AND DEVICE OF LABELING LASER POINT CLOUD", which is hereby incorporated by reference in its entirety.

FIELD OF INVENTION

The present application relates to the computer field and particularly to a method and a device of labeling laser point cloud.

BACKGROUND

At present in the development of the automatic driving technique, it is especially important to identify target objects (such as vehicles, move agents, tricycles, bicycles or the like) around a vehicle. A more commonly-used way nowadays is to detect targets objects around the vehicle by a LIDAR (such as a LIDAR with 8-line, 16-line, 32-line or 64-line), where the LIDAR emits pulsed laser light to the surroundings, when the pulsed laser light encounter objects, light returns and light point cloud is generated, by which target objects in the surroundings and its size, position and movement velocity could be identified.

At present, the main way of identifying target objects by using laser point clouds is as follows: labeling a received laser point cloud point by point manually in advance to obtain sample data from the laser point cloud corresponding to a target object; performing machine learning on the sample data to obtain an object recognition model; and identifying a target object corresponding to the laser point cloud by using the object recognition model.

BRIEF SUMMARY

At an aspect, embodiments of the present application provides a method of labeling laser point cloud, which includes:
  receiving data of a laser point cloud;
  constructing a 3D scene and establishing a 3D coordinate system corresponding to the 3D scene;
  converting a coordinate of each laser point in the laser point cloud into a 3D coordinate in the 3D coordinate system;
  mapping laser points included in the laser point cloud into the 3D scene according to the respective 3D coordinate of the laser points;
  labeling the laser points in the 3D scene.

At another aspect, embodiments of the present application further provides a device of labeling laser point cloud, which includes:
  a receiving unit configured to receive data of a laser point cloud;
  a constructing unit configured to construct a 3D scene and establish a 3D coordinate system corresponding to the 3D scene;
  a converting unit configured to convert a coordinate of each laser point in the laser point cloud into a 3D coordinate in the 3D coordinate system;
  a mapping unit configured to map laser points included in the laser point cloud into the 3D scene respectively according to the 3D coordinate of the laser points;
  a labeling unit configured to label the laser points in the 3D scene.

At another aspect, embodiments of the present application further provides a device of labeling laser point cloud, which includes: a processor and at least one memory, the at least one memory storing at least one machine executable instruction which is executed by the processor to:
  receive data of a laser point cloud;
  construct a 3D scene and establish a 3D coordinate system corresponding to the 3D scene;
  convert a coordinate of each laser point in the laser point cloud into a 3D coordinate in the 3D coordinate system;
  map laser points included in the laser point cloud into the 3D scene according to the respective 3D coordinate of the laser points; label the laser points in the 3D scene.

BRIEF DESCRIPTION OF THE DRAWINGS

The accompanying drawings are used to provide the further understanding of the present application and constitute a part of the specification, and serve to explain the present application together with the embodiments of the present application but not limit the present application.

DETAILED DESCRIPTION OF THE EMBODIMENTS

In order to make those skilled in the art better understand the technical solution in the present application, the technical solution in the embodiments of the present application will be described clearly and completely below in combination with the accompanying drawings. Obviously the described embodiments are just a part of the embodiments of the present application but not all the embodiments. Based upon the embodiments of the present application, all of other embodiments obtained by those ordinary skilled in the art without creative work should pertain to the protection scope of the present application.

In the related art, as object types of laser points in a laser point cloud are labeled one point by one point manually, the number of laser points included in the laser point cloud are huge, and lots of points included the laser cloud and excluded from a target object may be labeled, then low speed and efficiency of labeling operation may be resulted.

For addressing the problem of low speed and efficiency of labeling a laser point cloud existed in the related art, the embodiments of the present application provide a method and device for labeling laser point cloud to improve the speed and efficiency of labeling operation.

Figure 1:
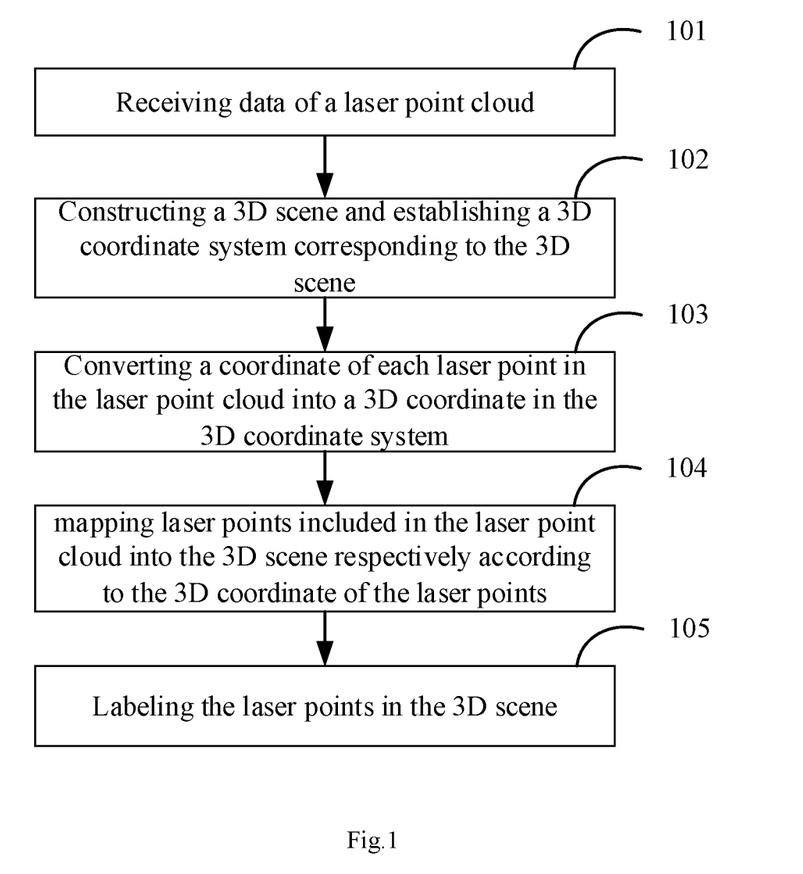
FIG. 1 is a flow chart of a method of labeling laser point cloud in an embodiment of the present application.

Referring to FIG. 1, which is a flow chart of a method of labeling laser point cloud provided by embodiments of the present application, the method includes:

Step 101: receiving, by a labeling device, data of a laser point cloud.

Step 102: constructing a 3D scene and establishing a 3D coordinate system corresponding to the 3D scene.

In an embodiment of the present application, the 3D scene could be constructed by using the WebGL technique, the OSG (Open Scene Graph) or the STK (Satellite Tool Kit) but not limited thereto. The way of constructing the 3D scene is not limited strictly by the present application.

Step 103: converting a coordinate of each laser point in the laser point cloud into a 3D coordinate in the 3D coordinate system.

Step 104: mapping laser points included in the laser point cloud into the 3D scene according to the respective 3D coordinate of the laser points.

Step 105: labeling the laser points in the 3D scene.

In the technical solution of the present application, a labeling device receives the data of the laser point cloud, reconstructs the 3D scene, map each laser point in the laser point cloud into the 3D scene, and label each laser point in the 3D scene. With the technical solution of the present application, since the laser point cloud is mapped into the 3D scene, and the laser points feedback from a same target object are relatively centralized and able to show the substantial contour of this target object, the labeling personnel could judge the laser points belonging to target types more visually and rapidly, and thus could label the laser points belonging to target types rapidly and targetedly. There is no need to process all laser points in the laser point cloud one point by one point before labeling the laser points belonging to certain target types. Thus the processing speed and the efficiency of labeling laser points could be improved.

In some embodiments, in order to distinguish the labeling results from the different types of laser points, in the above step 105, the laser points with different types are labeled in different labeling manners. Therefore the specific implementation of the above step 105 may be implemented by the following steps A1 to A2:

Step A1: determining types to which the laser points in the 3D scene belong;

Step A2: labeling the laser points by using labeling manners corresponding to the types to which the laser points belong, where different types correspond to different labeling manners.

Figure 2:
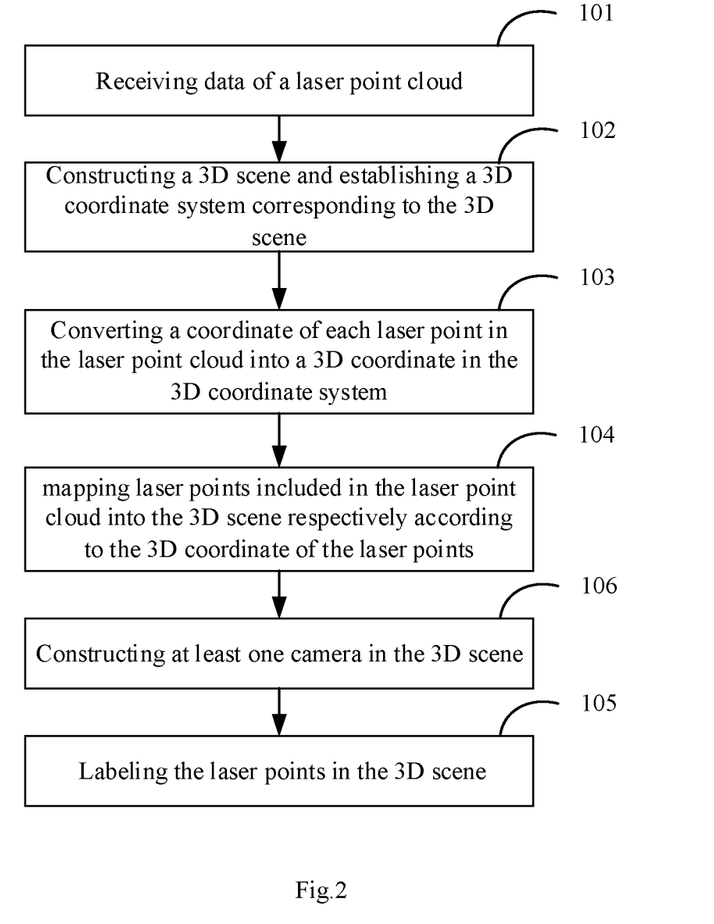
FIG. 2 is another flow chart of a method of labeling laser point cloud in an embodiment of the present application.

In some embodiments, since the laser point cloud contains a large number of laser points, in order to avoid the labeling omission and improve the comprehensiveness and the integrity of the labeling operation, in the technical solution of the present application, after the 3D scene is constructed, a camera is constructed in the 3D scene, and the laser points in the 3D scene may be viewed by adjusting the position and the direction of the camera in the 3D scene, to ensure that the labeling personnel could view the laser points in 360 degrees in the 3D scene. Therefore a step 106 may further be included before or after the step 103, or before or after the step 104, where the step 103 and step 104 of the method are described above as shown in FIG. 1. As shown in FIG. 2, the step 106 may be further included between the steps 104 and 105:

Step 106: constructing at least one camera in the 3D scene, to adjust an angle and a range of viewing the laser point cloud in the 3D scene by adjusting a position and a direction of the at least one camera in the 3D scene, during the process of labeling the laser points in the 3D scene.

In some embodiments, the method of labeling the laser point cloud may be applicable used in a browser, where after receiving the data of the laser point cloud sent by a server, the labeling device labels the received laser point cloud by using the method of labeling the laser point cloud described above and feeds back the labeling result to the server.

In order to further improve the accuracy of determining by the labeling personnel the types to which the laser points in the 3D scene belong, in the technical solution of the present application, at least two cameras are constructed in the 3D scene. The positions and the directions of the cameras are different at the same moment, so that the labeling personnel could view the laser points at different viewing angles to improve the accuracy of judging the types to which the laser points belong.

Figure 3:
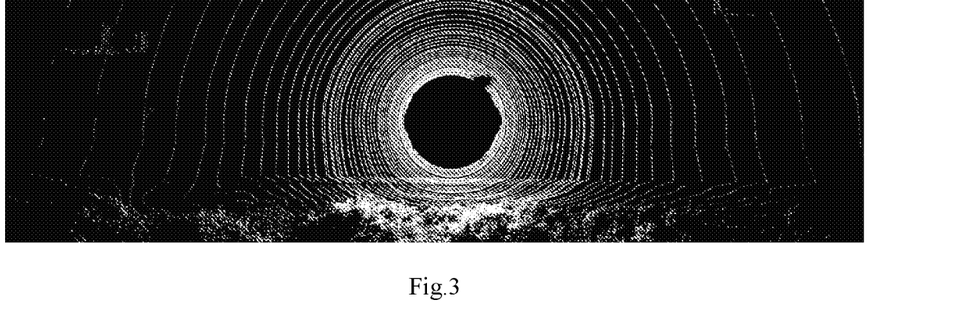
FIG. 3 is a schematic diagram of setting a camera in a 3D scene in an embodiment of the present application.
Figure 4:
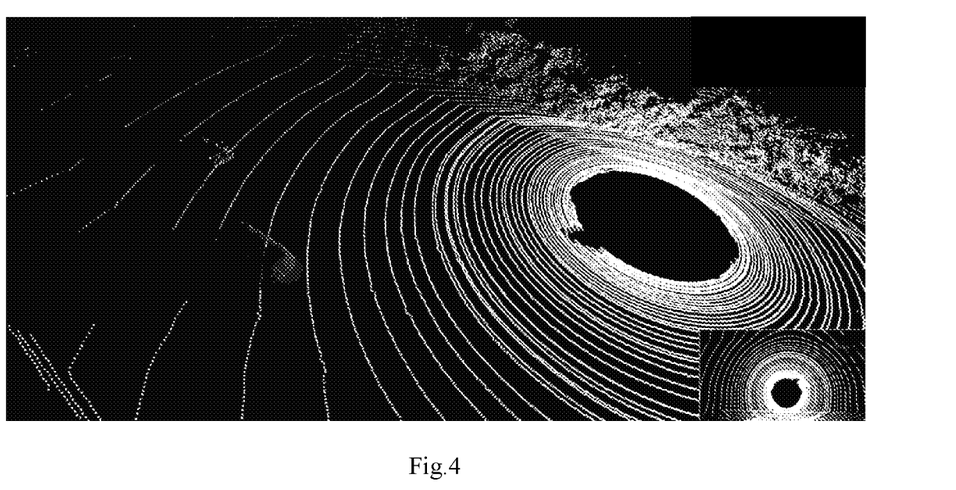
FIG. 4 is a schematic diagram of setting two cameras in a 3D scene in an embodiment of the present application.

The at least two cameras described above could be switched according to the user's selection. When the user selects one of the cameras, the position and the direction of the selected camera are taken as the corresponding angle and range for viewing the 3D scene presented to the user; and for the unselected camera, the angle and range for viewing the 3D scene corresponding to the unselected camera in the 3D scene are presented by way of thumbnails. FIG. 3 shows a schematic diagram of one camera, and FIG. 4 shows a schematic diagram of two cameras.

In a practical application, the number of the laser points belonging to a same target object is relatively large and these laser points are relatively centralized. In the case that the labeling personnel determines a plurality of laser points belonging to a same target object in a one-by-one labeling manner, the operation speed is relatively slow. Thus in the technical solution of the present application, in order to further improve the speed of labeling laser points, a plurality of laser points of a same type may be labeled uniformly at one or more times. The above steps A1 to A2 may be implemented by two following modes but not limited thereto.

First mode: a plurality of laser points which need to be labeled uniformly are selected by a 3D selecting box with a certain cubical space, and the labeling personnel moves the 3D selecting box in the 3D scene and labels the laser points falling within the 3D selecting box at this time uniformly when determining that the selection is needed. Specifically the above step A1 may be implemented by the following steps B1 to B3:

Step B1: generating a 3D selecting box according to first size information set by a user.

The size of the 3D selecting box may be entered by the user (e.g., the labeling personnel) in a corresponding input box of a preset labeling page, or the size of the 3D selecting box may be selected from multiple drop-down options of the input box, or the size of the 3D selecting box may be set in a preset size bar. There are a variety of specific implementations, which is not limited strictly by the present application.

Step B2: moving a position of the 3D selecting box in the 3D scene according to a first moving instruction input by the user.

In the embodiment of the present application, the 3D selecting box may be moved according to the user moving the mouse or clicking on the particular button, and the first moving instruction is generated according to the user operating on the mouse or the particular button. In the actual operation, the 3D selecting box is moved to the position where the laser points which need to be labeled are located by the labeling personnel moving the mouse or clicking on the particular button. For example, when the moving of the mouse is stopped (the duration of stopping the moving of the mouse exceeds the set duration threshold) or the clicking-on of the particular button is stopped (e.g., the duration of stopping the clicking-on of the particular button exceeds the set duration threshold), or the laser points falling within the 3D selecting box are determined as the laser points which need to be labeled (referred as target laser points hereinafter).

Step B3: when receiving a labeling instruction carrying a target type, taking laser points currently falling within the 3D selecting box as target laser points and taking the target type in the labeling instruction as a type to which the target laser points belong.

In the embodiment of the present application, after determining the target laser points, the labeling personnel sets the type of the target laser points, for example: enters the type to which the target laser points belong in a corresponding input box on a preset labeling page, or selects a type to which the target laser points belongs in multiple drop-down options of a input box. After setting the type to which the target laser points belong, the labeling personnel clicks on the submit button, and the labeling instruction is generated according to the set type (referred as target type hereinafter).

In the embodiment of the present application, the size of the 3D selecting box could be adjusted by the labeling personnel in real time.

Second mode: the user selects the positions, at which the laser points which need to be labeled are located, on the screen (referred as screen position points hereinafter), determines a plurality of laser points which need to be labeled (i.e., target laser points) according to the position of a camera and the screen position points, and labels the target laser points uniformly. Specifically the above step A1 may be implemented by the following steps C1 to C3:

Step C1: generating a ray by taking the position of a camera of the at least one camera as a start point and taking a screen position point selected by the user as an end point.

When a plurality of cameras are set in the 3D scene, the start point in the step C1 is the position of the currently-selected camera.

In the embodiment of the present application, the screen position point selected by the user could be a position point which is clicked on by the user on the screen via the mouse. In the actual operation, when the labeling personnel determines that a certain part of laser points centralized relatively in the 3D scene belong to a same type, he selects the screen position point at the position where this part of laser points are located.

Step C2: taking laser points meeting the following conditions as target laser points: a distance of a laser point from the start point is between a first distance threshold and a second distance threshold, and a vertical distance of the laser point from the ray is less than or equal to a third distance threshold.

Where the first distance threshold, the second distance threshold and the third distance threshold could be set flexibly according to actual requirements. In general case, the larger the cubical space constituted by the laser points belonging to a same type around the screen position point is, the larger the values of the first distance threshold, the second distance threshold and the third distance threshold are.

Step C3: when receiving a labeling instruction carrying a target type, taking the target type in the labeling instruction as a type to which the target laser points belong.

After the user selects the screen position point, he could enter the type to which the target laser points belong in a corresponding input box on a preset labeling page or select the type to which the target laser points belong in multiple drop-down options of a input box, and click on a submit button after setting the type to which the target laser points belong. Then the labeling instruction is generated according to the set type (i.e., target type).

The specific implementation of the above step A2 may be implemented by the following modes but not limited thereto.

First mode: color differentiation is used for different types of the laser points belonging to, which is specifically implemented as: the labeling instruction further contains a labeling color corresponding to the target type, and the step A2 is to set a color of the target laser points to be the labeling color in the labeling instruction, where different target types correspond to different labeling colors. For example, when the target type is vehicle, the corresponding labeling color is dark blue; when the target type is ground, the corresponding labeling color is black; when the target type is tree, the corresponding labeling color is green; which is not limited strictly by the present application.

In the first mode, the labeling color in the labeling instruction is the labeling color corresponding to the type and could be set by the labeling personnel while he sets the type to which the target laser points belong. The manner of setting the labeling color may refer to the manner of setting the type, and a detailed description thereof will be omitted here.

In the first mode, setting the color of the target laser point to be the labeling color in the labeling instruction may include that setting a RGB value of the target laser points to be the RGB value corresponding to the labeling color, or painting the color of the target laser points into the labeling color via a brush tool. If the color of the target laser points is painted as the labeling color via the brush tool, then the operation that setting the color of the target laser points to be the labeling color in the labeling instruction described above may be achieved specifically by the following steps D1 to D2:

Step D1: generating a 3D coloring box according to second size information set by the user.

The 3D coloring box has a certain space volume, and the 3D coloring box is a brush tool.

Step D2: moving the 3D coloring box according to a second moving instruction input by the user, to paint the color of the target laser points falling within the 3D coloring box during the moving process into the labeling color in the labeling instruction.

The manner of inputting the second size information and the second moving instruction by the user could refer to the manner of inputting the first size information and the first moving instruction by the user described above, and a detailed description thereof will be omitted here.

In order to implement color modification to the target laser points, in an embodiment of the present application, the 3D coloring box has a brush function and an eraser function. When the attribute of the 3D coloring box is set to be the brush function, the color of the laser points is painted into the color corresponding to the type to which the laser points belong by the 3D coloring box; and when the attribute of the 3D coloring box is set to be the eraser function, the color of the laser points of which the color needs to be modified is erased by the 3D coloring box. In an embodiment of the present application, a brush button and an eraser button could be preset. When the user clicks on the brush button, the 3D coloring box is set with the brush function; and when the user clicks on the eraser button, the 3D coloring box is set with the eraser function.

Thus the method of setting the color of the target laser points to be the labeling color in the labeling instruction described above further includes steps D3 to D4:

Step D3: setting the 3D coloring box with an eraser attribute according to an erasure instruction input by the user;

Step D4: moving the 3D coloring box according to a third moving instruction input by the user, to erase the color of the laser points falling within the 3D coloring box during the moving process.

Second mode: the labeling instruction further contains a labeling box pattern corresponding to the target type, and the step A2 may be specifically implemented as follows: generating a 3D labeling box according to the labeling box pattern, and labeling each target laser point respectively by using the 3D labeling box, where different target types correspond to different labeling box patterns. For example, when the target type is vehicle, the corresponding labeling box pattern is a transparent cuboid with dark blue borders; when the target type is pedestrian, the corresponding labeling box pattern is a transparent cuboid with red borders; which is not limited strictly by the present application. Where the size of the cuboid is related to the volume of the geometric space constituted by the target laser points in the 3D scene. The larger the volume is, the larger the size of the corresponding cuboid is.

In the second mode, the labeling box pattern in the labeling instruction is the labeling box pattern corresponding to the type set by the labeling personnel when he sets the type to which the target laser points belong. The manner of setting the labeling box pattern could refer to the manner of setting the type, and a detailed description thereof will be omitted here.

Third mode: determining a labeling color corresponding to the type to which the laser points belong according to a preset correspondence between types and labeling colors, and setting a color of the laser points to be the labeling color corresponding to the type to which the laser points belong.

In the third mode, the correspondence between types and labeling colors is preset. When the labeling instruction is received, the labeling color corresponding to the target type in the labeling instruction is obtained from the correspondence.

Fourth mode: determining a labeling box pattern corresponding to the type to which the laser points belong according to a preset correspondence between types and labeling box patterns, generating a labeling box according to the labeling box pattern corresponding to the type to which the laser points belong, and labeling the laser points by using the labeling box.

In the fourth mode, the correspondence between types and labeling box patterns is preset. When the labeling instruction is received, the labeling box pattern corresponding to the target type in the labeling instruction is obtained from the correspondence.

Figure 5:
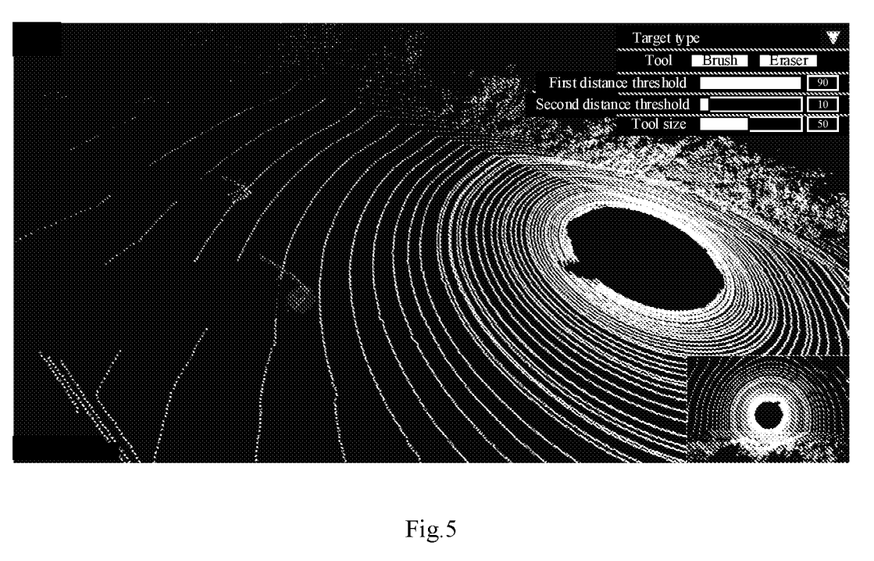
FIG. 5 is a schematic diagram of labeling laser point cloud in the 3D scene in an embodiment of the present application.

A specific instance is taken as an example, in which two cameras are set in the 3D scene. The labeling results for different types are differentiated by different colors. The 3D coloring box is set, as shown in FIG. 5. The option box of the target type, the size bar of the 3D coloring box, the function selection button, and the setting box of the first and second distance thresholds are set on the labeling interface.

In order to improve the efficiency and speed of transmission the results of labeling the laser points, in an embodiment of the present application, the laser points in the received laser point cloud are provided with serial numbers, where different laser points have different serial numbers; after the operation of labeling the laser points which need to be labeled in the 3D scene is completed, the serial numbers and the labeling results of the laser points are packaged and transmitted. Since the transmission data does not contain the coordinate information of the laser points, the data transmission amount is reduced and the data transmission efficiency is improved to certain extent. For example, when the laser points are labeled by different colors, the serial numbers of the laser points and the color values of the labeling colors are packaged and transmitted.

Figure 6:
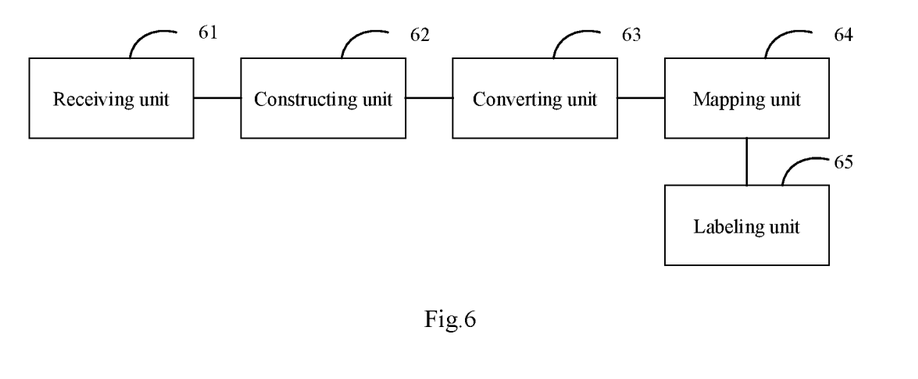
FIG. 6 is a structural schematic diagram of a device of labeling laser point cloud in an embodiment of the present application.

Based upon the same concept of the method of labeling laser point cloud provided above, some embodiments of the present application further provide a device of labeling laser point cloud. The structure of the device is as shown in FIG. 6, which includes:

a receiving unit 61 configured to receive data of a laser point cloud;

a constructing unit 62 configured to construct a 3D scene and establish a 3D coordinate system corresponding to the 3D scene;

a converting unit 63 configured to convert a coordinate of each laser point in the laser point cloud into a 3D coordinate in the 3D coordinate system;

a mapping unit 64 configured to map laser points included in the laser point cloud into the 3D scene respectively according to the 3D coordinate of the laser points;

a labeling unit 65 configured to label the laser points in the 3D scene.

The constructing unit 62 is specifically configured to construct the 3D scene by the WebGL technique.

In some embodiments of the present application, the constructing unit 62 may also specifically construct the 3D scene by the OSG (Open Scene Graph) or the STK (Satellite Tool Kit). The way of constructing the 3D scene is not limited strictly by the present application.

In order to differentiate the labeling results from the different types of laser points, the labeling unit 65 uses different labeling manners to label the different types of laser points. The labeling unit 65 specifically includes:

a determining subunit (which is not illustrated on the figures) configured to determine types to which the laser points in the 3D scene belong;

a labeling subunit (which is not illustrated on the figures) configured to label the laser points by using labeling manners corresponding to the types to which the laser points belong, wherein different types correspond to different labeling manners.

Figure 7:
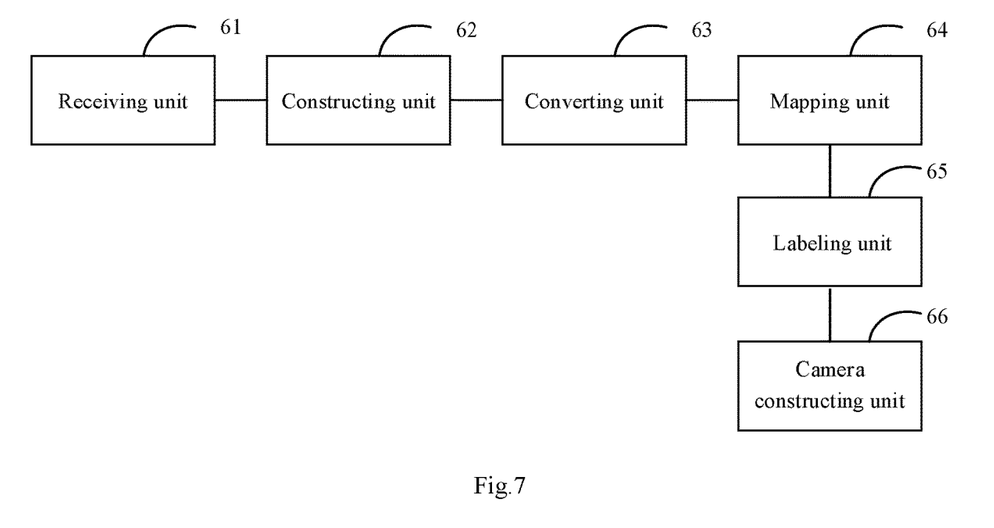
FIG. 7 is another structural schematic diagram of a device of labeling laser point cloud in an embodiment of the present application.

Since the laser point cloud contains a large number of laser points, in order to avoid the labeling omission and improve the comprehensiveness and the integrity of the labeling operation, in an embodiment of the present application, after the 3D scene is constructed, a camera is constructed in the 3D scene, and the laser points in the 3D scene are viewed by adjusting the position and the direction of the camera in the 3D scene, to ensure that the labeling personnel could view the laser points in 360 degrees in the 3D scene. The above device as shown in FIG. 6 further includes a camera constructing unit 66, as shown in FIG. 7:

the camera constructing unit 66 is configured to construct at least one camera in the 3D scene, to adjust an angle and a range of viewing the laser point cloud in the 3D scene by adjusting a position and a direction of the at least one camera in the 3D scene, during the process of labeling the laser points in the 3D scene.

In order to further improve the accuracy of determining by the labeling personnel the types to which the laser points in the 3D scene belong, in some embodiments of the present application, the camera constructing unit 66 constructs at least two cameras in the 3D scene. The positions and the directions of the cameras are different at the same moment, so that the labeling personnel could view the laser points at different viewing angles to improve the accuracy of judging the types to which the laser points belong.

The at least two cameras described above could be switched according to the user's selection. When the user selects one of the cameras, the position and the direction of the selected camera are taken as the corresponding angle and range for viewing the 3D scene presented to the user; and for the unselected camera, the angle and range for viewing the 3D scene corresponding to the unselected camera in the 3D scene are presented by way of thumbnails.

In a practical application, the number of the laser points belonging to a same target object is relatively large and these laser points are relatively centralized. In the case that the labeling personnel determines a plurality of laser points belonging to a target object in a one-by-one labeling manner, the operation speed is relatively slow. Thus in the technical solution of the present application, in order to further improve the speed of labeling laser points, the determining subunit could label a plurality of laser points of a same type uniformly at one or more times. Therefore the specific implementation of the determining subunit may be achieved by two following modes.

First mode: the determining subunit is configured to: generate a 3D selecting box according to first size information set by a user; move a position of the 3D selecting box in the 3D scene according to a first moving instruction input by the user; when receiving a labeling instruction carrying a target type, take laser points currently falling within the 3D selecting box as target laser points and take the target type in the labeling instruction as a type to which the target laser points belong.

In an embodiment of the present application, the size of the 3D selecting box could be adjusted by the labeling personnel in real time.

Second mode: the determining subunit is configured to: generate a ray by taking the position of a camera of the at least one camera as a start point and taking a screen position point selected by the user as an end point; take laser points meeting the following conditions as target laser points: a distance of a laser point from the start point is between a first distance threshold and a second distance threshold, and a vertical distance of the laser point from the ray is less than or equal to a third distance threshold; when receiving a labeling instruction carrying a target type, take the target type in the labeling instruction as a type to which the target laser points belong.

Where the first distance threshold, the second distance threshold and the third distance threshold could be set flexibly according to actual requirements. In general case, the larger the cubical space constituted by the laser points belonging to a same type around the screen position point is, the larger the values of the first distance threshold, the second distance threshold and the third distance threshold are.

In some embodiments, the labeling instruction further contains a labeling color corresponding to the target type, and the labeling subunit is specifically configured to: set a color of the target laser points to be the labeling color in the labeling instruction, where different target types correspond to different labeling colors;

or, the labeling instruction further contains a labeling box pattern corresponding to the target type, and the labeling subunit is specifically configured to: generate a 3D labeling box according to the labeling box pattern, and label each target laser point respectively by using the 3D labeling box, where different target types correspond to different labeling box patterns.

In some embodiments, the labeling subunit sets the color of the target laser point to be the labeling color in the labeling instruction, which is configured to:

generate a 3D coloring box according to second size information set by the user;

move the 3D coloring box according to a second moving instruction input by the user, to paint the color of the target laser points falling within the 3D coloring box during the moving process into the labeling color in the labeling instruction.

In order to implement the color modification to the target laser points, in some embodiments of the present application, the 3D coloring box has a brush function and an eraser function. When the attribute of the 3D coloring box is set to be the brush function, the color of the laser points is painted into the color corresponding to the type to which the laser points belong by the 3D coloring box; and when the attribute of the 3D coloring box is set to be the eraser function, the color of the laser points of which the color needs to be modified is erased by the 3D coloring box. In an embodiment of the present application, a brush button and an eraser button could be preset. When the user clicks on the brush button, the 3D coloring box is set with the brush function; and when the user clicks on the eraser button, the 3D coloring box is set with the eraser function. The labeling subunit is further configured to: set the 3D coloring box with an eraser attribute according to an erasure instruction input by the user; move the 3D coloring box according to a third moving instruction input by the user, to erase the color of the laser points falling within the 3D coloring box during the moving process.

The labeling subunit is configured to: determine a labeling color corresponding to the type to which the laser points belong according to a preset correspondence between types and labeling colors, and set a color of the laser points to be the labeling color corresponding to the type to which the laser points belong; or determine a labeling box pattern corresponding to the type to which the laser points belong according to a preset correspondence between types and labeling box patterns, generate a labeling box according to the labeling box pattern corresponding to the type to which the laser points belong, and label the laser points by using the labeling box.

In some embodiments, the device of labeling the laser point cloud could be set on a browser, where after receiving the data of the laser point cloud sent by a server, the browser labels the received laser point cloud by the device of labeling the laser point cloud and feeds back the labeling result to the server.

Figure 8:
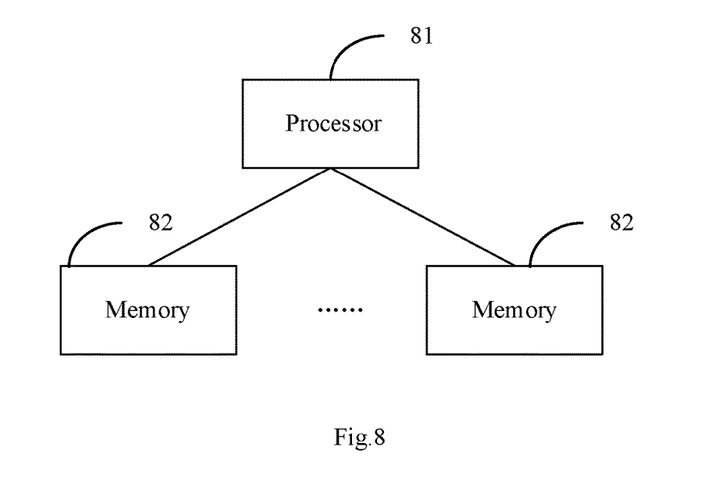
FIG. 8 is another structural schematic diagram of a device of labeling laser point cloud in an embodiment of the present application.

Based upon the same concept of the method of labeling laser point cloud provided above, some embodiments of the present application further provide a device of labeling laser point cloud. The structure of the device is as shown in FIG. 8, which includes: a processor 81 and at least one memory 82, where the at least one memory 82 stores at least one machine executable instruction.

The processor 81 executes the at least one machine executable instruction to: receive data of a laser point cloud; construct a 3D scene and establish a 3D coordinate system corresponding to the 3D scene; convert a coordinate of each laser point in the laser point cloud into a 3D coordinate in the 3D coordinate system; map laser points included in the laser point cloud into the 3D scene respectively according to the 3D coordinate of the laser points; label the laser points in the 3D scene.

In some embodiments, the processor 81 executes the at least one machine executable instruction to label the laser point in the 3D scene, which comprises: determine types to which the laser points in the 3D scene belong; label the laser points by using labeling manners corresponding to the types to which the laser points belong, where different types correspond to different labeling manners.

In some embodiments, the processor 81 executes the at least one machine executable instruction to construct the 3D scene and then further to: construct at least one camera in the 3D scene, to adjust an angle and a range of viewing the laser point cloud in the 3D scene by adjusting a position and a direction of the at least one camera in the 3D scene, during the process of labeling the laser points in the 3D scene.

In some embodiments, the processor 81 executes the at least one machine executable instruction to determine types to which the laser points in the 3D scene belong according to a first mode or a second mode:

First mode: generating a 3D selecting box according to first size information set by a user; moving a position of the 3D selecting box in the 3D scene according to a first moving instruction input by the user; when receiving a labeling instruction carrying a target type, taking laser points currently falling within the 3D selecting box as target laser points and taking the target type in the labeling instruction as a type to which the target laser points belong;

Second mode: generating a ray by taking the position of a camera of the at least one camera as a start point and taking a screen position point selected by the user as an end point; taking laser points meeting the following conditions as target laser points: a distance of a laser point from the start point is between a first distance threshold and a second distance threshold, and a vertical distance of the laser point from the ray is less than or equal to a third distance threshold; when receiving a labeling instruction carrying a target type, taking the target type in the labeling instruction as a type to which the target laser points belong.

In some embodiments, the labeling instruction further contains a labeling color corresponding to the target type, then the processor 81 executes the at least one machine executable instruction to label the laser points according to the labeling manner corresponding to the type to which the laser points belong, which comprises: set a color of the target laser points to be the labeling color in the labeling instruction, where different target types correspond to different labeling colors;

or, the labeling instruction further contains a labeling box pattern corresponding to the target type, then the processor executes the at least one machine executable instruction to label the laser points according to the labeling manner corresponding to the type to which the laser points belong, which specifically comprises: generate a 3D labeling box according to the labeling box pattern, and label each target laser point respectively by using the 3D labeling box, where different target types correspond to different labeling box patterns;

where the processor 81 executes the at least one machine executable instruction to set the color of the target laser points to be the labeling color in the labeling instruction, which comprises: generate a 3D coloring box according to second size information set by the user; move the 3D coloring box according to a second moving instruction input by the user, to paint the color of the target laser points falling within the 3D coloring box during the moving process into the labeling color in the labeling instruction.

In some embodiments, the processor 81 further executes the at least one machine executable instruction to: set the 3D coloring box with an eraser attribute according to an erasure instruction input by the user; move the 3D coloring box according to a third moving instruction input by the user, to erase the color of the laser points falling within the 3D coloring box during the moving process.

In some embodiments, the processor 81 executes the at least one machine executable instruction to label the laser points according to the labeling manner corresponding to the type to which the laser points belong, which comprises: determine a labeling color corresponding to the type to which the laser points belong according to a preset correspondence between types and labeling colors, and set a color of the laser point to be the labeling color corresponding to the type to which the laser points belong; or determine a labeling box pattern corresponding to the type to which the laser points belong according to a preset correspondence between types and labeling box patterns, generate a 3D labeling box according to the labeling box pattern corresponding to the type to which the laser points belong, and label the laser points by using the 3D labeling box.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the box diagrams of the methods, the devices (systems) and the computer program products according to the embodiments of the present application. It should be understood that each process and/or box in the flow charts and/or the box diagrams, and a combination of processes and/or blocks in the flow charts and/or the box diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the box diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the box diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the box diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method of labeling a laser point cloud, comprising:
   receiving, by a device for labeling laser point clouds, data of the laser point cloud;
   constructing a 3D scene and establishing a 3D coordinate system corresponding to the 3D scene;
   converting a coordinate of each laser point in the laser point cloud into a 3D coordinate in the 3D coordinate system;
   mapping laser points in the laser point cloud into the 3D scene using the 3D coordinates of the laser points; and
   labeling the laser points in the 3D scene, including:
      determining types to which the laser points in the 3D scene belong, including:
         using a first mode or a second mode,
         wherein the first mode comprises:
            generating a 3D selecting box according to a first size information set by a user;
            moving a position of the 3D selecting box in the 3D scene in response to a first moving instruction input by the user; and
            in response to receiving a labeling instruction comprising a target type, taking laser points within the 3D selecting box as target laser points and taking the target type in the labeling instruction as a type to which the target laser points belong;
         and wherein the second mode comprises:
            generating a ray between a start point and an end point;
            taking laser points meeting the following conditions as target laser points: a distance of a laser point from the start point is between a first distance threshold and a second distance threshold, and a distance of the laser point from the ray is less than or equal to a third distance threshold; and
            in response to receiving a labeling instruction comprising a target type, taking the target type in the labeling instruction as a type to which the target laser points belong.

2. The method according to claim 1, wherein labeling the laser points in the 3D scene comprises:
   labeling the laser points by using labeling manners corresponding to the types to which the laser points belong, wherein different types correspond to different labeling manners.

3. The method according to claim 2, wherein the labeling instruction comprises a labeling color corresponding to the target type or a labeling box pattern corresponding to the target type, and labeling the laser points by using labeling manners corresponding to the types to which the laser points belong comprises:
   setting a color of the target laser points to be the labeling color in the labeling instruction, wherein different target types correspond to different labeling colors, or,
   generating a 3D labeling box according to the labeling box pattern, and labeling each target laser point by using the 3D labeling box, wherein different target types correspond to different labeling box patterns.

4. The method according to claim 3, wherein setting a color of the target laser points to be the labeling color in the labeling instruction comprises:
   generating a 3D coloring box according to a second size information set by the user, and
   moving the 3D coloring box in response to a second moving instruction input by the user, to paint the color of the target laser points within the 3D coloring box during the moving process into the labeling color in the labeling instruction; or,
   setting the 3D coloring box with an eraser attribute according in response to an erasure instruction input by the user, and
   moving the 3D coloring box in response to a third moving instruction input by the user, to erase the color of the laser points within the 3D coloring box during the moving process.

5. The method according to claim 2, wherein labeling the laser points by using labeling manners corresponding to the types to which the laser points belong comprises:
   determining a labeling color corresponding to the type to which the laser points belong according to a preset correspondence between types to which the laser points belong and labeling colors, and
   setting a color of the laser points to be the labeling color corresponding to the type to which the laser points belong; or
   determining a labeling box pattern corresponding to the type to which the laser points belong according to a preset correspondence between types to which the laser points belong and labeling box patterns, generating a 3D labeling box according to the labeling box pattern corresponding to the type to which the laser points belong, and labeling the laser points by using the 3D labeling box.

6. The method according to claim 1, comprising: constructing at least one camera in the 3D scene, to adjust an angle and a range of viewing the laser point cloud in the 3D scene by adjusting a position and a direction of the at least one camera in the 3D scene.

7. The method according to claim 6, wherein a position of a camera of the at least one camera is the start point of the ray and a screen position point selected by the user is the end point of the ray.

8. A device for labeling laser point cloud, the device comprising:
   a receiving unit configured to receive data of a laser point cloud;

a constructing unit configured to construct a 3D scene and establish a 3D coordinate system corresponding to the 3D scene;

a converting unit configured to convert a coordinate of each laser point in the laser point cloud into a 3D coordinate in the 3D coordinate system;

a mapping unit configured to map the laser points in the laser point cloud into the 3D scene using the 3D coordinates of the laser points;

a labeling unit configured to label the laser points in the 3D scene, including:

a determining subunit configured to determine types to which the laser points in the 3D scene belong using a first mode or a second mode, wherein the first mode comprises:

generating a 3D selecting box according to a first size information set by a user;

moving a position of the 3D selecting box in the 3D scene in response to a first moving instruction input by the user; and in response to receiving a labeling instruction comprising a target type, taking laser points within the 3D selecting box as target laser points and taking the target type in the labeling instruction as a type to which the target laser points belong;

and wherein the second mode comprises:

generating a ray between a start point and an end point;

taking laser points meeting the following conditions as target laser points; a distance of a laser point from the start point is between a first distance threshold and a second distance threshold, and a distance of the laser point from the ray is less than or equal to a third distance threshold; and in response to receiving a labeling instruction comprising a target type, taking the target type in the labeling instruction as a type to which the target laser points belong.

9. The device according to claim 8, wherein the labeling unit comprises:

a labeling subunit configured to label the laser points by using labeling manners corresponding to the types to which the laser points belong, wherein different types correspond to different labeling manners.

10. The device according to claim 9, wherein the labeling instruction comprises a labeling color corresponding to the target type or a labeling box pattern corresponding to the target type, and the labeling subunit is configured to:

set a color of the target laser points to be the labeling color in the labeling instruction, wherein different target types correspond to different labeling colors, or generate a 3D labeling box according to the labeling box pattern, and label each target laser point by using the 3D labeling box, wherein different target types correspond to different labeling box patterns.

11. The device according to claim 10, wherein the labeling subunit configured to:

generate a 3D coloring box according to a second size information set by the user, and move the 3D coloring box in response to a second moving instruction input by the user, to paint the color of the target laser points within the 3D coloring box during the moving process into the labeling color in the labeling instruction;

or, set the 3D coloring box with an eraser attribute in response to an erasure instruction input by the user, and move the 3D coloring box according in response to a third moving instruction input by the user, to erase the color of the laser points fatting within the 3D coloring box during the moving process.

12. The device according to claim 9, wherein the labeling subunit is configured to:

determine a labeling color corresponding to the type to which the laser points belong according to a preset correspondence between types to which the laser points belong and labeling colors, and set a color of the laser points to be the labeling color corresponding to the type to which the laser points belong; or determine a labeling box pattern corresponding to the type to which the laser points belong according to a preset correspondence between types to which the laser points belong and labeling box patterns, generate a 3D labeling box according to the labeling box pattern corresponding to the type to which the laser points belong, and label the laser points by using the 3D labeling box.

13. The device according to claim 8 wherein the device comprises:

a camera constructing unit configured to construct at least one camera in the 3D scene, to adjust an angle and a range of viewing the laser point cloud in the 3D scene by adjusting a position and a direction of the at least one camera in the 3D scene.

14. The device according to claim 13, wherein a position of a camera of the at least one camera is the start point of the ray and a screen position point selected by the user is the end point of the ray.

15. A device for labeling a laser point cloud, the device comprising: a processor and a memory, wherein the memory is configured to store at least one machine executable instruction, and the processor is configured to execute the at least one machine executable instruction to:

receive data of the laser point cloud;

construct a 3D scene and establish a 3D coordinate system corresponding to the 3D scene;

convert a coordinate of each laser point in the laser point cloud into a 3D coordinate in the 3D coordinate system;

map the laser points in the laser point cloud into the 3D scene using the 3D coordinates of the laser points; and label the laser points in the 3D scene, comprising:

determine types to which the laser points in the 3D scene belong, comprising:

a first mode or a second mode, wherein the first mode comprises:

generate a 3D selecting box according to a first size information set by a user;

move a position of the 3D selecting box in the 3D scene in response to a first moving instruction input by the user; and in response to receiving a labeling instruction comprising a target type, take laser points within the 3D selecting box as target laser points and take the target type in the labeling instruction as a type to which the target laser points belong;

and wherein the second mode comprises:

generate a ray between a start point and an end point;

take laser points meeting the following conditions as target laser points: a distance of a laser point from the start point is between a first distance threshold and a second distance threshold, and a distance of the laser point from the ray is less than or equal to a third distance threshold; and in response to receiving a labeling instruction comprising a target type, take the target type in the labeling instruction as a type to which the target laser points belong.

16. The device according to claim 15, wherein the processor is configured to execute the at least one machine executable instruction to:

label the laser points by using labeling manners corresponding to the types to which the laser points belong, wherein different types correspond to different labeling manners.

17. The device according to claim 16, wherein the labeling instruction comprises a labeling color corresponding to the target type or a labeling box pattern corresponding to the target type, and wherein the processor is configured to execute the at least one machine executable instruction to:

set a color of the target laser points to be the labeling color in the labeling instruction, wherein different target types correspond to different labeling colors, or generate a 3D labeling box according to the labeling box pattern, and label each target laser point by using the 3D labeling box, wherein different target types correspond to different labeling box patterns.

18. The device according to claim 17 wherein the processor is configured to execute the at least one machine executable instruction to execute at least one of:

generate a 3D coloring box according to a second size information set by the user, and move the 3D coloring box in response to a second moving instruction input by the user, to paint the color of the target laser points within the 3D coloring box during the moving process into the labeling color in the labeling instruction; or, set the 3D coloring box with an eraser attribute in response to an erasure instruction input by the user, and move the 3D coloring box in response to a third moving instruction input by the user, to erase the color of the laser points within the 3D coloring box during the moving process.

19. The device according to claim 16, wherein the processor is configured to execute the at least one machine executable instruction to:

determine a labeling color corresponding to the type to which the laser points belong according to a preset correspondence between types to which the laser points belong and labeling colors, and set a color of the laser points to be the labeling color corresponding to the type to which the laser points belong; or determine a labeling box pattern corresponding to the type to which the laser points belong according to a preset correspondence between types to which the laser points belong and labeling box patterns, generate a 3D labeling box according to the labeling box pattern corresponding to the type to which the laser points belong, and label the laser point by using the 3D labeling box.

20. The device according to claim 15, wherein the processor is configured to execute the at least one machine executable instruction to:

construct at least one camera in the 3D scene, to adjust an angle and a range of viewing the laser point cloud in the 3D scene by adjusting a position and a direction of the at least one camera in the 3D scene.

21. The device according to claim 20, wherein a position of a camera of the at least one camera is the start point of the ray and a screen position point selected by the user is the end point of the ray.

* * * * *